United States Patent [19]
Cocuzza et al.

[11] 3,875,019
[45] Apr. 1, 1975

[54] RECOVERY OF ETHYLENE GLYCOL BY PLURAL STAGE DISTILLATION USING VAPOR COMPRESSION AS AN ENERGY SOURCE

[75] Inventors: Gioacchino Cocuzza, Catania; Italo Montoro, Como; Benedetto Calcagno, Milan, all of Italy

[73] Assignee: Societa' Italiana Resine S.I.R. S.p.A., Milan, Italy

[22] Filed: Dec. 26, 1973

[21] Appl. No.: 428,578

[30] Foreign Application Priority Data
Dec. 22, 1972 Italy................................. 33443/72

[52] U.S. Cl......................... 203/18, 203/26, 203/75
[51] Int. Cl........................... C07c 29/26, C12f 1/04
[58] Field of Search............. 203/18, 24, 26, 27, 42, 203/75, 17; 260/635 E, 637 R

[56] References Cited
UNITED STATES PATENTS

| | | | |
|---|---|---|---|
| 1,822,455 | 9/1931 | Ricard et al. | 203/27 |
| 2,126,974 | 8/1938 | Reich | 203/27 |
| 2,510,548 | 6/1950 | Brunjes | 203/18 |
| 3,388,046 | 6/1968 | Hendrix | 203/18 |
| 3,414,484 | 12/1968 | Carson et al. | 203/26 |

*Primary Examiner*—A. Louis Monacell
*Assistant Examiner*—Frank Sever
*Attorney, Agent, or Firm*—Sughrue, Rothwell, Mion, Zinn & Macpeak

[57] ABSTRACT

An improved process for the separation of ethylene glycol from the dilute aqueous glycol solutions originating from the hydrolysis of ethylene oxide by multi-state evaporation of the glycol solutions and subsequent rectification of the concentrated aqueous glycol solutions, wherein the improvement comprises:

subjecting the dilute aqueous gylcol solutions to multi-stage evaporation at decreasing pressures to obtain, in the last stage, an aqueous solution containing about 70 to 80% by weight of glycols;

subjecting the aqueous glycol solution coming from the last stage of the multi-stage evaporation to rectification in a rectification column in order to separate the residual water;

removing the vapours coming from the last stage of the multi-stage evaporator and using them as a heating means in the reboiler of the rectification column after previous thermal or mechanical compression;

removing the condensate coming from the reboiler of the rectification column and using it for washing of the vapours generated in the last stage of the multi-stage evaporation, weight ratios of wash water to vapours generated of from about 1:1 to 1:10 being maintained;

removing the wash solution from the last stage of the multistage evaporation and recycling it to a preceding stage, preferably to the first.

1 Claim, 1 Drawing Figure

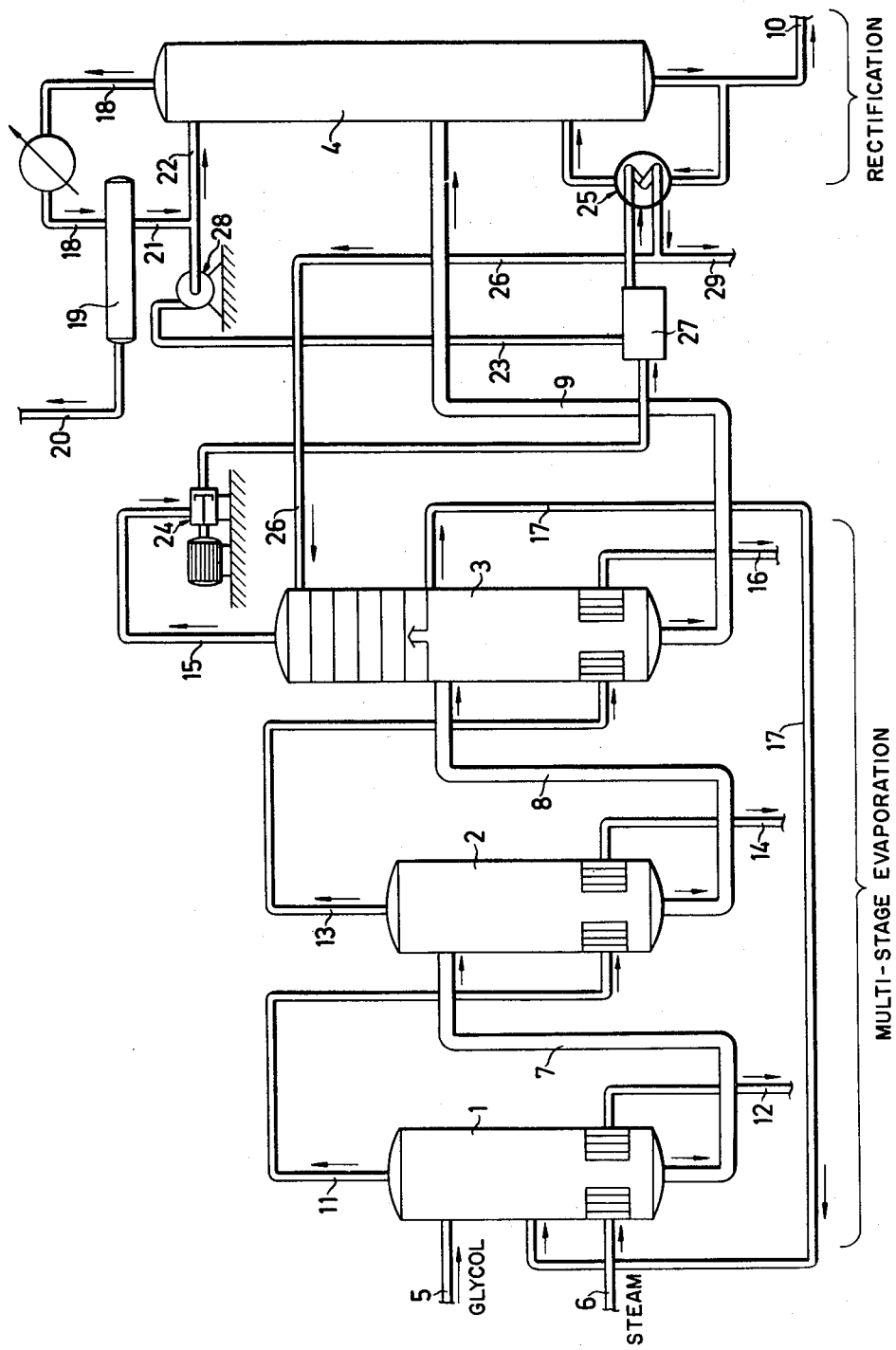

RECOVERY OF ETHYLENE GLYCOL BY PLURAL STAGE DISTILLATION USING VAPOR COMPRESSION AS AN ENERGY SOURCE

BACKGROUND OF THE INVENTION

1. Field of the Invention

The invention relates to an improved process for the production of ethylene glycol, and particularly to the separation of ethylene glycol from the solutions obtained by hydrolyzing ethylene oxide in aqueous media.

2. Description of the Prior Art

According to a process widely used in the art, ethylene oxide is produced by contacting a gaseous stream containing ethylene and oxygen with a silver catalyst. This process is carried out at temperatures of from about 150° to 400°C, at pressures of from atmospheric pressure up to about 30 kg/cm², whereby reaction gases having an ethylene oxide content of from about 1 to 3 % by volume are obtained. The reaction gases are then subjected to scrubbing with an aqueous solvent to separate the ethylene oxide in the form of an aqueous solution. Finally, the ethylene oxide is recovered by stripping the aqueous solution.

In industrial practice, the ethylene oxide thus obtained is converted into ethylene glycol by reacting it with water in the presence or absence of catalysts; see Ulmanns Encyklopaedie der technischen Chemie, 3rd edition, vol. 3, pp. 136 and 138.

In the catalytic processes, hydrolysis of the ethylene oxide is carried out using a dilute aqueous solution of an acid, normally sulfuric acid. However, other acidic catalysts such as phosphoric acid and trichloroacetic acid or acidic ion-exchange resins are also suited.

In the non-catalytic processes, the ethylene oxide is brought into contact with water, and the hydrolysis is carried out at high temperatures and pressures.

Each of these processes results in an aqueous solution of ethylene glycol containing also small quantities of diethylene glycol and triethylene glycol. In order to maximize the yield of ethylene glycol high weight ratios of water to ethylene oxide are employed in the hydrolysis of ethylene oxide. Usual weight ratios of water to ethylene oxide are in the range of from 7:1 to 20:1 and this raises the problem of economically separating the ethylene glycol from the water.

A further problem resides in the separation of ethylene glycol in pure form and in high yields. The separation is usually accomplished by rectification of the aqueous solutions. However, in view of the low glycol concentrations and the high heat of evaporation of water, this procedure is uneconomical.

According to another known process, therefore, the separation of the water is carried out in two steps. Particularly, in a first step the quantity of water is reduced to about 40% by weight of the glycol solution by a multi-stage evaporation system operating at decreasing pressures in the various stages down to values below atmospheric pressure. In a second step, the remaining water is eliminated by rectification. In this last step low pressures are employed because of the possible degradation of the glycol at temperatures close to the boiling point at atmospheric pressure. A disadvantage of this process results from the relatively high content of water in the solution that is passed to rectification.

According to another known method, therefore, during the multistage evaporation, high concentrations of glycol are attained in the residual aqueous solution, and the vapour liberated in the last evaporation stage is subjected to washing the water. This washing limits the losses of glycol in the last evaporation stage.

However, the fact that the aqueous wash solution is caused to flow down in the said last stage necessarily leads to a decrease in the content of glycol in the solution passed to rectification.

Moreover, the washing as carried out in the known processes, leads to an accumulation of impurities in the aqueous solution of the glycol to be passed to rectification. In fact, the condensate from the top of the rectification column is normally used as the wash water. This condensate, which is partly used as reflux of the rectification column, the remainder being passed as wash water to the last stage, is contaminated with the decomposition products of the glycols as well as by any impurities present in the original ethylene oxide. The recycling of the condensate to the last stage therefore leads to an increase of impurities in the aqueous solution of the glycols and a decrease in purity of the glycol mixture at the base of the rectification column.

SUMMARY

It is therefore an object of this invention to provide an improved process for separating ethylene glycol contained in the aqueous solutions originating from the hydrolysis of ethylene oxide.

It is a further object of this invention to provide a simple and economical process for separating ethylene glycol from dilute aqueous solutions which allows to obtain ethylene glycol in pure form and in high yields.

These objects and others which will become apparent from the following description are accomplished in accordance with this invention by subjecting the dilute aqueous glycol solutions to multi-stage evaporation at decreasing pressures to obtain, it the last stage, an aqueous solution containing about 70 to 80% by weight of glycols;

subjecting the aqueous glycol solution coming from the last stage of the multi-stage evaporation to rectification in a rectification column in order to separate the residual water;

removing the vapours coming from the last stage of the multi-stage evaporator and using them as a heating means in the reboiler of the rectification column after previous thermal or mechanical compression;

removing the condensate coming fom the reboiler of the rectification column and using it for washing of the vapours generated in the last stage of the multi-stage evaporation, weight ratios of wash water to vapours generated of from about 1:1 to 1:10 being maintained;

removing the wash solution from the last stage of the multi-stage evaporation and recycling it to a preceding stage, preferably to the first.

This process leads to considerable improvements as compared to the prior art resulting from the fact that the dilute aqueous solution originating from said washing is taken from the last evaporation stage and passed to an earlier stage, preferably to the first;

the condensate of the vapours from the top of the last evaporation stage is used for washing the vapours generated in this last stage;

the vapours coming from the last evaporation stage are previously used as heating means in the reboiler of the rectification column.

It has been found that by operating in this way and according to the other conditions that will be described later, it is possible to pass aqueous solutions having high glycol concentrations to rectification, the concentrations being of the order of 70% by weight or more. Moreover, the process of the present invention allows practically complete recovery of the glycol.

These advantages result from the specific recycling of the aqueous wash solution, since on the one hand dilution phenomena are avoided in the last stage of the multi-stage evaporation, and on the other hand it is possible to use a quantity of water for washing such as to allow complete recovery of the glycol carried away with the vapours in the last evaporation stage. Moreover, a glycol of high purity is obtained in the process of the present invention. It is thought that this is due at least partly to the possibility of continuously eliminating the impurities having boiling points between those of water and of the glycols coming from the top of the rectification column and from the last evaporation stage.

Finally, another economic advantage of the process of the present invention resides in the use of the vapours from the last evaporation stage as heating means in the reboiler of the rectification column.

In particular, according to the process of the present invention, the aqueous solution of ethylene glycol is first subjected to evaporation by the multi-stage technique.

The aqueous solutions that are subjected to this treatment are those originating from the hydrolysis of ethylene oxide, and containing about 5 to 17% by weight of ethylene glycol. These solutions also contain smaller amounts of diethylene glycol and triethylene glycol, and are freed from any catalyst used for the hydrolysis previous to evaporation. In particular, the multi-stage evaporation is carried out at pressures decreasing in the range of from about 10 to 1,5 kg/cm². For instance, pressures of the order of about 8 kg/cm² in the first stage down to about 1.5 kg/cm² in the last stage may be maintained. The evaporation temperatures are in the range of from about 180° to 130°C.

The number of evaporation stages should be at least two and may assume values as high as 25. Preferably, three evaporation stages are used in series, with pressures that still vary from a maximum of e.g. about 8 kg/cm² to a minimum of about 1.5 kg/cm².

The types of apparatus suitable for this purpose are vertical evaporators with short tubes or vertical boilers with long tubes connected to containers for the liquid-vapour separation and with natural or forced circulation of the evaporating liquid in the boiler.

Moreover, the liquid-vapour separator of the final evaporation stage has a certain number of plates (normally three to 10) in the upper part. There is also a two-flow plate which allows the passage of the vapour coming from below and collects the stream of wash water descending from above. In this way it is possible to pass the wash water to an earlier evaporation stage, preferably to the first evaporation stage.

Under the conditions described, an aqueous solution containing glycol in a quantity equal to or greater than 70% by weight and generally in the range of from about 70 to 80% by weight is separated in the last evaporation stage.

Moreover, according to a fundamental characteristic of the process of the present invention, the vapours generated in the last evaporation stage are subjected to washing with water. More particularly, in this treatment, weight ratios of wash water to vapour of from about 1:1 to 1:10 are employed, and the washing is carried out at temperatures of from about 130° to 160°C. In practical performance of the process of the present invention, the washing of the vapours is carried out in the apparatus of the last evaporation stage.

The concentrated aqueous solution of the glycol coming from the last evaporation stage is fed to a rectification column, in which the residual water is removed. In particular, the rectification is carried out at pressures of from about 50 to 400 mmHg and at temperature of from about 130° to 180°C. Packed columns or plate columns having five to 40 plates may be used for the purpose.

By operating in this way, the practically anhydrous ethylene glycol is recovered at the base of the column together with small amounts of diethylene glycol and triethylene glycol practically free from other impurities.

The fraction drawn off at the base may be subjected to distillation to separate the individual glycols.

The vapours taken from the top of the last evaporation stage are used as a heating means in the reboiler of the rectification column. These vapours, before being fed to the reboiler of the rectification column, are conveniently subjected to mechanical or thermal compression. The condensate from these vapours is partly used for scrubbing the vapours generated in the last evaporation stage, whereas the remaining part is purged. This purging allows to continuously eliminate the impurities, so that their accumulation is avoided.

Finally, the condensate originating from the top of the rectification column is used for lowering the temperature of the compressed vapour passed to the reboiler of the rectification column.

The invention is further illustrated but not intended to be limited by the following example and the accompanying drawing.

EXAMPLE

With reference to the attached drawing, the references 1, 2, and 3 indicate the concentrators used for evaporation of the glycol solution by the multi-stage technique. These concentrators are vertical evaporators with short tubes, fitted with downcomers in the central part to give a high rate of recirculation.

An aqueous solution containing ethylene glycol (13% by weight), diethylene glycol (1% by wight), and triethylene glycol (0.12% by weight) is fed to the concentrator 1 through pipe 5. Steam is fed to the concentrator 1 at a pressure of 11 kg/cm² through pipe 6, and the condensate is discharged through pipe 12.

The concentrator 1 is operated at a temperature of about 165°C and at a pressure of about 8 atmospheres absolute. Steam containing about 1.4% by weight of ethylene glycol is discharged at the top of the concentrator 1 and is fed to the reboiler of the concentrator 2 through pipe 11. At the base of the concentrator 1 an aqueous solution containing about 18.7% by weight of glycols is discharged and fed to the concentrator 2 through pipe 7.

The concentrator 2 is operated at a temperature of about 155°C and at a pressure of about 5 atmospheres absolute. At the top of the concentrator 2, steam containing 2.5% by weight of ethylene glycol is liberated and is fed to the reboiler of the concentrator 3 through pipe 13, while an aqueous solution containing about 30% by weight of glycols is discharged at the base. This solution is fed to the concentrator 3 through pipe 8.

The concentrator 3 is fitted in the upper part with 5 perforated plates and with a two-flow plate for collecting the wash water. For stripping the glycol contained in the vapours generated in the concentrator 3 wash water is fed into the top of the concentrator 3 through pipe 26. In particular, a weight ratio of wash water to vapour generated of about 1:2 is maintained. The vapours containing about 0.5% by weight of ethylene glycol are discharged from the concentrator 3 through pipe 15 and are compressed mechanically in 24 to about 5 kg/cm². The concentrator 3 is operated at a temperature of about 142°C and at a pressure of about 2 kg/cm². The aqueous wash solution is removed from the concentrator 3 by means of the two-flow plate, and the solution containing about 16% by weight of glycol is recycled to the concentrator 1 through pipe 17. An aqueous solution containing about 70% by weight of glycols is discharged at the base of the concentrator 3 through pipe 9 and is fed in at the fourth plate from the base of the distillation column 4 having 12 plates.

In column 4, the rectification is carried out at a base temperature of about 140°C, at a pressure of about 95mmHg, and with a reflux ratio of about 4.5. The vacuum in column 4 is maintained by a group of ejectors connected to the column through pipe 20. Steam containing 0.5% by weight of ethylene glycol is discharged from the top of the column 4 through pipe 18 and is condensed in the condenser 19. The condensate is partly recycled as reflux to the top of column 4 through pipes 21 and 22. The remaining part is injected by means of pump 28 and through pipe 23 into 27 were the temperature of the overheated vapours coming from 24 is lowered. The vapour saturated at 5 atmospheres absolute obtained by mixing the condensate 23 and the overheated vapour from 24 is fed to the reboiler 25 of column 4. The condensate is finally partly fed to the concentrator 3 through pipe 26, the remaining part being purged ghrough pipe 29 to avoid the accumulation of circulating impurities.

The condensates from the three reboilers in pipes 12, 14, and 16, may be recycled, after mixing with fresh ethylene oxide, to the hydrolysis step. In this way, the glycols discharged from the three concentrators are recovered, together with the steam.

The anhydrous glycols are recovered through pipe 10 at the base of column 4 in a yield of about 99% with respect to those contained in the mixture fed through pipe 5.

The ethylene glycol is separated from these glycols by distillation with a purity of about 99.5% by weight, the remaining percentage consisting of water and diethylene glycol.

What we claim is:

1. An improved process for the separation of ethylene glycol from the dilute aqueous glycol solutions originating from the hydrolysis of ethylene oxide by multi-stage evaporation of the glycol solutions and subsequent rectification of the concentrated aqueous glycol solutions, wherein the improvement comprises:

subjecting the dilute aqueous glycol solutions to three-stage evaporation at decreasing pressures in the range of from about 10 to 1.5 kg/cm² and at a temperature of about from 180° to 130°C to obtain, in the last stage, an aqueous solution containing about 70 to 80% by weight of glycols;

subjecting the aqueous glycol solution coming from the last stage of the multi-stage evaporation to rectification in a rectification column having five to 40 plates at a pressure of from about 50 to 400 mm mercury and at a temperature of from about 130° to 180°C in order to separate the residual water;

removing the vapours coming from the last stage of the multistage evaporator and using them as a heating means in the reboiler of the rectification column after previous thermal or mechanical compression;

removing the condensate coming from the reboiler of the rectification column and using it for washing at a temperature of from about 130° to 160°C of the vapours generated in the last stage of the multistage evaporation, weight ratios of wash water to vapours generated of from about 1:1 to 1:10 being maintained;

removing the wash solution from the last stage of the multistage evaporation and recycling it to the first stage.

* * * * *